May 25, 1965 R. W. KENNEY 3,185,344
FLUID CONTROL SYSTEM AND SET STOP CONTROL VALVE THEREFOR
Filed Feb. 15, 1963 3 Sheets-Sheet 1

INVENTOR.
ROBERT W. KENNEY
BY
Andrus & Starke
Attorneys

May 25, 1965 R. W. KENNEY 3,185,344
FLUID CONTROL SYSTEM AND SET STOP CONTROL VALVE THEREFOR
Filed Feb. 15, 1963 3 Sheets-Sheet 2

INVENTOR.
ROBERT W. KENNEY
BY
Andrus & Starke
Attorneys

May 25, 1965

R. W. KENNEY 3,185,344

FLUID CONTROL SYSTEM AND SET STOP CONTROL VALVE THEREFOR

Filed Feb. 15, 1963

INVENTOR.
ROBERT W. KENNEY
BY
Andrus & Starke
Attorneys

:::
United States Patent Office 3,185,344
Patented May 25, 1965

3,185,344
FLUID CONTROL SYSTEM AND SET STOP
CONTROL VALVE THEREFOR
Robert W. Kenney, South Pasadena, Calif., assignor to
A. O. Smith Corporation, Milwaukee, Wis., a corporation of New York
Filed Feb. 15, 1963, Ser. No. 258,854
20 Claims. (Cl. 222—20)

This invention relates to a set stop control valve and particularly to a hydraulically responsive set stop control valve for liquid transfer systems in which preselected quantities are periodically taken from storage through the valve.

In the distribution of petroleum products and other liquids, a bulk plant is provided at which large quantities of the petroleum products are stored for subsequent distribution through transport trucks or the like. The products are ordered and purchased in relatively large quantities by distributors.

A completely automatic flow control means is preferably provided having preset means for delivering a preselected quantity of the product from the storage unit to the tank truck. The transfer flow in the system from the storage unit is usually at a substantial rate and it is important that the flow is not stopped suddenly at one point in the system. The mass of the petroleum products flowing through the system has a substantial inertia and if a sudden block is inserted in the system, excessive and damaging pressures might arise in the system causing disruption of the components if not an actual breakage in the line. Further, with the development of automated control systems, the meter and the main control valve may be spaced substantially from each other and a signal transfer and control response means provide rapid actuation of the main valve in accordance with the operation of the meter.

The present invention is particularly directed to a hydraulically actuated set stop valve which reduces the flow in stages before complete stoppage to prevent abnormal establishments of pressure. The valve of the present invention is a rugged and reliable structure having a rapid response and can be readily remotely controlled.

In such systems, it is at times necessary to discharge the liquid from the storage tank at a predetermined constant pressure and flow rate. The valve of this invention may include pressure and rate of flow control valves within the system without any changes in the valve structure including the orifices and basic connections. This provides a very versatile assembly particularly adapted to the various commercial applications required.

In accordance with the invention, the set stop main valve is a hydraulically actuated or responsive valve preferably of the diaphragm type wherein a movable diaphragm is coupled to the main valve seal member and forms a part of an operating pressure chamber. A multistage valve closing means selectively connects the inlet or supply side and the outlet or drain side to the pressure chamber defined by the diaphragm of the main valve for accurately sequentially setting of the valve to at least one partially closed condition and then a final closed position. Suitable electromagnetic or other control units can be provided for controlling the operating fluid flow to the pilot valve means for the closing of the set stop valve and in this manner provide a very simple, ready remote control. A particularly simple system would employ electromagnetic valves controlling the interconnection of the pilot valve means to the inlet and outlet sides of the main valve.

Generally, in a preferred construction, the set stop valve includes a main diaphragm valve in the flow line which is hydraulically urged to a full flow position by the incoming liquid. A diaphragm or similar pressure controlled means is oppositely biased by a hydraulic pressure under the control of a two-stage hydraulically actuated control means. A differential area is provided such that line pressure transmitted through the control means is sufficient to hold the main valve in a closed position. The control means includes a main closure unit and a first stage closing pilot valve which constitutes a throttling control.

The pilot valve is a resiliently mounted valve assembly which is resiliently biased to the closed position and interrupts a passageway from the supply line to the diaphragm of the main valve. In the initial operation, this circuit is open to unload the pilot valve and allow the incoming pressure to effect an opening of the main valve. As a result of this opening, the pilot valve is mechanically or otherwise opened against the resilient bias thereon to condition that portion of the pilot valve for closing of the main valve. If a partial closing of the valve is desired, the final closure valve is held in the same position as that for a fully open flow position. The first stage closing pilot valve however is connected to the supply side of the valve such that the incoming pressure to the pilot valve is transmitted via the first stage closing section to the main valve and effects a movement tending to reduce the opening therethrough. During this initial movement, the pilot valve follows the movement of the main valve and at a preselected position of the main valve the pilot valve closes to prevent further transfer of the closing pressure to the main control valve. The pressure is then applied directly to the pilot valve and holds it in the closed position; thereby holding the main valve in the throttling position.

When the complete flow is to stop, the final closure valve section of the control means is connected through the control valve to the supply side of the main valve and thus returns the apparatus to the standby or closed position.

As a result, the flow through the valve can be maintained at a full flow for the greater portion of the period required for transmitting quantity of liquid. As the amount transmitted approaches the final value, the first stage closing section of the pilot valve is operated to slowly move the valve to a throttled position at which it is set for the balance of the flow period. When a preselected quantity has been transmitted, the partially closed main valve is moved rapidly to the full closed position. In this manner, the quantity of liquid transmitted can be very accurately controlled in accordance with any preselected setting.

A particularly simple control system employs a counter mechanism driven by the meter for actuating a pair of control switches. One switch is actuated at a zero setting to operate the main section of the pilot valve means and the other switch is set to actuate the first stage closing section of the pilot valve means at a preselected quantity ahead of zero and to hold the valve in the partial open position for all the values down to zero. The transmission of the electrical signals is exceedingly rapid and consequently the valve can be actuated very rapidly.

Further, in accordance with the present invention, a rate of flow control and a pressure control can be inserted between the discharge of the main valve and the control to the pilot valve to preset the pressure and rate of flow in accordance with any desired setting. The rate of flow control in accordance with known procedures is connected through an orificing arrangement in the inlet side of the main valve and is adjustable through any suitable means such as a spring loaded diaphragm arrangement having an adjusting screw. The pressure control may also employ a spring loaded diaphragm valve having an adjusting screw to vary the pressure applied thereto and having an opposing pressure applied from the discharge side to counterbalance the spring pressure.

The present invention provides a highly reliable multiple stage closing of a valve for transmitting liquids at high rates and pressures. The system is particularly adapted to metering of preselected quantities to a very high degree of accuracy. The use of an electromagnetic on-off control is particularly desirable in allowing a very simple and ready means for stopping flow in the case of emergency through the mere disruption of the power at any point in the circuit. Further, as previously noted, the set stop valve of the present invention is very versatile in that a rate of flow control and/or a pressure control can be connected in the system by inserting of the units in a connecting line between the main valve and the pilot valve means.

The drawings furnished herewith illustrate the best mode presently contemplated for carrying out the invention.

In the drawings:

FIG. 1 is a diagrammatic illustration of a petroleum flow system for transferring of a petroleum product from a storage unit or supply to a tank or transport truck with a set stop valve constructed in accordance with the present invention shown in isometric;

FIG. 2 is an enlarged vertical section of the set stop valve including the pilot valve means and the several control and operating valves shown in section and interconnected schematically by suitable flow lines which also represent the necessary connecting conduits between the several components to more clearly show the working relation and organization of the parts forming the flow control system;

FIG. 3 is an enlarged exploded view of the pilot valve means of FIGS. 1 and 2 for controlling the main valve portion of the set stop valve;

Figure 1:
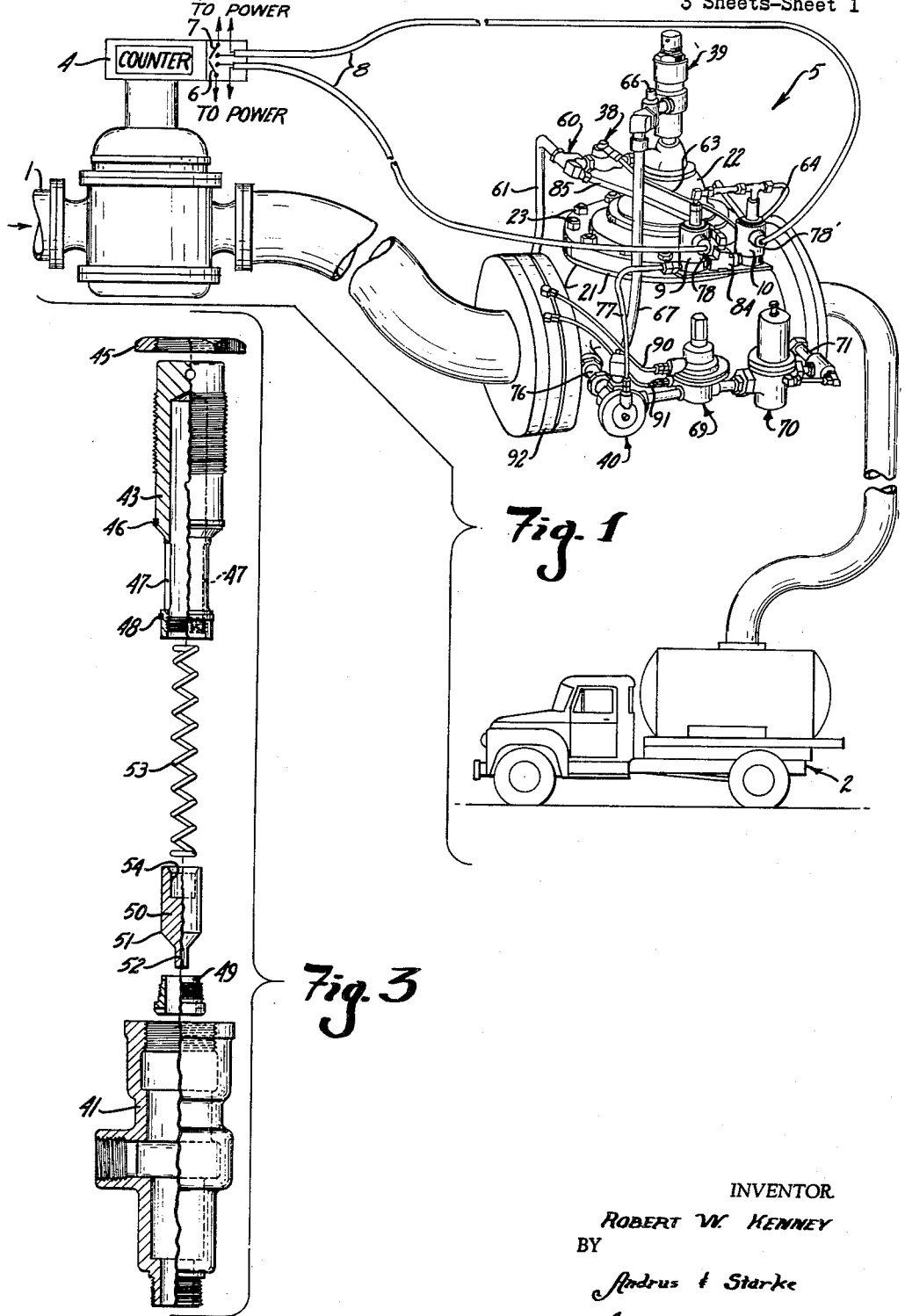

Referring to the drawings and particularly to FIG. 1, the illustrated flow system includes a main supply line 1 inter-connected by a suitable pump, not shown except by a flow arrow, to any suitable supply such as a large storage tank or the like, not shown, in which a substantial quantity of a liquid such as gasoline is maintained for subsequent delivery and distribution. A transport or tank truck 2 is shown coupled to the discharge end of line 1 for receiving a preselected quantity from line 1; for example, 10,000 gallons of the product from the supply tank. A meter 3 is mounted in the line 1 on the discharge side of the pressure pump or the like, not shown, and is driven in accordance with the volumetric flow through the line 1. Suitable temperature compensating means and the like are normally provided in accordance with known practice. A presettable counter 4 is mounted on the meter 3 and driven back to zero in accordance with the flow through the meter 3. The flow in line 1 is controlled by a set stop valve unit 5 which is located between meter 3 and the discharge end of line 1 and which may be mounted immediately adjacent the meter 3 or spaced therefrom as diagrammatically shown by the break in line 1.

The illustrated set stop valve unit 5 is constructed in accordance with the present invention to allow full flow through the line 1 until an approach is made to the final total quantity desired to be delivered to the tank truck 2 at which time the flow is reduced to a relative low rate such that the valve can be abruptly fully closed without creating any damaging pressures in the system. Proper timed control of the set stop valve unit 5 is provided by a dual switch unit mounted on and controlled by the counter 4 and including a pair of switches 6 and 7. Suitable control lines 8 interconnect the switches 6 and 7 to a pair of solenoids 9 and 10 at the set stop valve unit 5 to operate the unit in accordance with the counting position of the counter 4. Counter 4 and switches 6 and 7 are interconnected to actuate the set stop valve to the full flow position with the counter 4 preset in accordance with the total flow requirement. The switches 6 and 7 are sequentially actuated and operate solenoid valves 9 and 10 in sequence during the final period of delivery as hereinafter described.

The counter 4 may be of any suitable variety such as a multiple wheel unit having the adjacent wheels related to the various digits in the decimal system and with each wheel being driven once for a multiple movement of the preceding wheel; such as shown for example in the copending application of James H. McGaughey entitled Control System which was filed on February 7, 1961 with Serial No. 88,208 and which is assigned to a common assignee herewith. Cams on the wheels may be coupled to the switches 6 and 7 for opening and closing at predetermined setting of the counter, as hereinafter more fully described.

Figure 2:
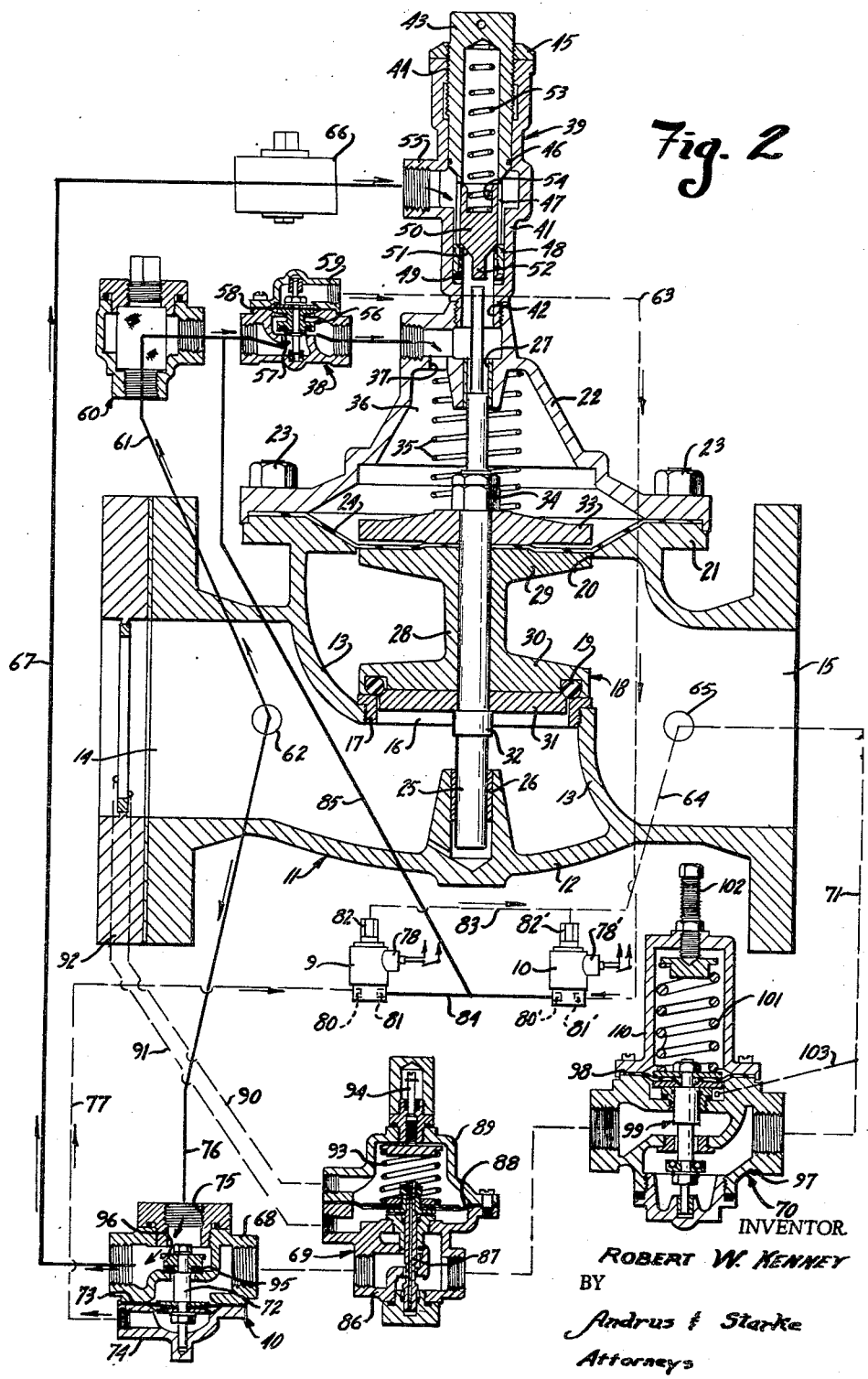

Referring to the drawings and particularly to FIGS. 1 and 2, the set stop valve unit 5 includes a main diaphragm valve 11 which is illustrated as a modified globe pattern valve having a globe type valve body 12 terminating at the opposite ends in suitable mounting flanges for interconnection in line 1. The valve body 12 includes an internal transverse wall 13 dividing the valve body into a supply or inlet chamber 14 and a drain or outlet chamber 15. The internal wall 13 includes a horizontal section having a vertical valve opening 16 connecting chambers 14 and 15. An annular valve seat 17 is threaded into or otherwise secured within the opening 16 and a valve stem assembly 18 is mounted for vertical movement on the axis of the opening. The stem assembly 18 supports a sealing O-ring 19 which is adapted to be selectively moved into sealing engagement with the inner peripheral edge portion of the annular seat 17. The stem assembly 18 also extends upwardly through a top wall opening 20 in the valve body 12 and is connected to a hydraulically actuated valve control means as follows.

An outer flange 21 is integrally provided in valve body 12 encircling the top wall opening 20 and an inverted generally cup-shaped cover 22 is secured in overlying relationship to the flange by a plurality of circumferentially distributed stud and bolt assemblies 23. A valve control diaphragm 24 forming a part of the stem assembly 18 spans the opening 20 and is clamped between the flange 21 and cover 22 to seal the top wall opening 20 about the stem assembly 18.

More particularly, the stem assembly 18 includes a rod-like stem 25 which projects axially through the openings 16 and 20 and is slidably journaled in a lower bearing 26 within the inlet chamber 14 and an upper bearing 27 in the central top end of the cover 22 with the upper end of the stem projecting upwardly through an opening in cover 22. An O-ring retainer 28 is slidably mounted on the stem 25 and includes an enlarged upper flange end 29 which corresponds to the diameter of the opening 20 and a lower disc end flange 30 with the peripheral edge overlying the seat 17. The underside of the flange 30 is recessed to receive the O-ring 19 and an O-ring clamping washer 31 which substantially corresponds in diameter to the opening 16 is mounted on the stem to hold the O-ring 19 within the recess when moved from seat 17. The washer 31 is supported on an encircling shoulder 32 on the stem 25 and supports the retainer 28 in corresponding relation to stem 25. The length of the retainer 28 generally corresponds to the axial distance between the seat 17 and the opening 20 such that the diaphragm 24 can be clamped against the flange 29. A diaphragm washer 33 is clamped in bearing engagement on the diaphragm 24 and the retainer 28 by a clamp nut 34 which is threaded onto an intermediate threaded portion of the stem 25 within the cover 22. Thus, the several washers and stem are clamped between the clamp nut 24 and the shoulder 32, as most clearly shown in FIG. 2.

A preloading spring 35 encircles the stem 25 within the cover 22 and acts between the upper inner surface of the cover and the back side of the diaphragm washer 33 to urge the stem assembly vertically downwardly with the O-ring 19 in sealing engagement with the seat 17.

The underside of washer 31 and thus stem assembly 18 is subjected to the incoming line pressure which tends to open the valve 11 and allow flow from the inlet chamber 14 to the outlet chamber 15 through the opening 16. Generally, the spring 35 is not of a sufficient strength to hold the valve closed against the line pressure. The precise position of the valve 11 is controlled by the pressure on the outer side of the diaphragm 24 and within the cover pressure chamber 36 defined by the cover 22. A liquid supply drain passageway 37 is provided in the uppermost end of the cover 22 and opens laterally outwardly and also upwardly about stem 25. The lateral opening of passageway 37 is connected to a final close control valve 38 connected to the inlet chamber 14 of the main valve body 10 for selectively establishing opening and closing pressures within chamber 36. The control valve 38 is actuated to the open and closed position by solenoid valve 10, as subsequently described. If the chamber 36 is connected to the inlet chamber 14 of the main supply valve 11, the combined force of the pressure of the spring 35 and the pressure in the cover chamber 36 is sufficient to overcome the line pressure on the underside of the stem assembly and in particular on the washer 31. This is true because the area of the diaphragm washer 33 is slightly greater than the area of the O-ring washer 31 and thus a slightly greater hydraulic closing force is established when the chamber 36 communicates with the inlet chamber 14. The additional force of spring 35 assures a firm positive liquid tight closure of the opening 16.

A set stop pilot valve 39 is secured to the top cover 22 and provides an initial or premature actuation of the stem assembly 18 as the counter 4 establishes a reading approaching zero to effect a partial closing of the main valve 11. Generally, the set stop pilot valve 39 is a hydraulically actuated valve interconnected by an accelerator valve 40 to the inlet chamber 14 and the outlet chamber 15 of the valve body 12 by operation of the control solenoid 9.

The pilot valve 39, shown in an exploded view in FIG. 3, includes a tubular valve body 41 having a lower threaded projection secured within a correspondingly tapped opening 42 forming a part of passageway 37 in the cover 22 to selectively connect the supply line pressure to chamber 36 via the pilot valve 39. A hollow pilot valve stem 43, closed integrally at its outer end, is slidably disposed within the valve body 41 and is adjustably positioned therein through a threaded connection 44 at the outer end of the valve body. A lock nut 45 is threaded onto the projecting threaded portion of the pilot valve stem 43 to lock the stem in any one of an infinite number of positions within the length of the threaded portion on the stem. A suitable O-ring seal 46 or the like is mounted within a groove in the valve stem 43 and seals the upper portion of the stem to the valve body 41. The portion of the valve stem 43 inwardly of the seal 46 is reduced in diameter and is provided with a pair of diametrically opposed slots 47 which terminate in slightly spaced relation to the lowermost end of the stem and provide communication between the body 41 and the interior of stem 43. An O-ring seal 48 encircles the lower continuous end of the valve stem 43 and engages the side wall of the lower portion of the valve body 41 to provide sliding liquid tight seal therebetween. An annular or tubular valve seat 49 is secured within the lower end of the stem in any suitable manner as by the threaded connection shown to allow ready removal and replacement thereof.

A valve poppet 50 is slidably disposed within the hollow stem 43 and includes a conical lower sealing surface 51 terminating in a central stem 52 aligned with the upper end of the stem 25 of stem assembly 18. A coil spring 53 is located within the hollow pilot valve stem 43 with the lower end disposed within a locating recess 54 in the back side of the poppet 50. The coil spring 53 is under compression and continuously urges the poppet 50 forwardly, downwardly in FIGS. 2-5, into sealing engagement with the valve seat 49. The outer end of the valve poppet 50 is generally aligned with the upper end of slots 47 one of which extends along the conical surface to the outer enlarged portion of the stem such that communication is maintained at all times between the exterior of the stem 43 and the interior of the stem with the poppet engaging the seat 49. The slotted portion in the innermost position of the stem 43 generally has its upper end aligned with an inlet connecting chamber 55 which is adapted to be selectively connected to the supply or inlet chamber 14 and the drain or discharge chamber 15 of the main valve body 12. When chamber 55 is connected to the supply chamber 15 and the valve stem 25 of stem assembly 18 is in the raised position holding the poppet 50 in spaced relation to the valve seat 49, the pressure is transmitted downwardly through the slots 47 and the interior of the stem 43 and the tapped opening 42 of the passage 37 in cover 22 to the cover chamber 36. The line pressure is thus transferred to the diaphragm washer 33 and urges the valve 11 to a closed position. As the valve 11 moves downwardly, the poppet 50 moves with it maintaining engagement with the upper end of the valve stem 25 until such time as the poppet 50 seats against valve seat 49 and interrupts the pressure flow path from the inlet connection 55 to the cover chamber 36. The pilot valve 39 therefore closes the valve 11 in accordance with the relative positioning or spacing between stem extension 52 and the upper end of stem 25. This in turn is controlled by the positioning of valve stem 43 with the valve body 41 in pilot valve 39. When the inlet connection 55 of valve 39 is connected to the drain or outlet chamber 15, the stem assembly 18 can move to the full open position holding the poppet valve in spaced relation to the valve seat without the transmission of any pressure to the cover chamber 36 therefrom.

In summary, to hold the valve 11 in the closed position as shown in FIG. 2, the inlet connection 55 and the lateral opening to passage 37 in cover 22 are connected to the supply or inlet chamber 14 of the valve body 12 to transmit the line pressure to the respective elements. The pressure through passageway 37 into cover chamber 36 in combination with the spring 35 holds the valve 11 closed. When it is desired to open the valve 11 to the maximum position, the connection to passageway 37 is closed and the input connection 55 is connected to the drain or outlet chamber 15 of the main valve body 11, thereby removing pressure from chamber 36. As a result, the incoming pressure on the underside of the stem assembly 18 causes the stem 25 to rise upwardly and after a predetermined partial opening the upper end of the stem 25 engages the lower extension 52 of poppet 50 and moves it upwardly in spaced relation to the valve seat 49. The liquid trapped in the cover chamber 36 is allowed to move outwardly through the passageway 37 including vertical opening 42 and the pilot valve 39 and then to the drain via inlet connection 55 by the raising of the poppet 50 under the pressure of the liquid in chamber 36. The incoming pressure holds the stem assembly upwardly in the maximum position and establishes maximum flow therethrough. To close the valve 11, the inlet connection 55 is first connected to the supply or inlet chamber 14 by proper operation of solenoid valve 9 which actuates the pilot valve 39 to close and block the passageway and in so doing move the valve stem assembly 18 downwardly to a partial closing position. When the final closure is desired, the closure valve 38 is actuated by operation of solenoid valve 10 to connect the lateral opening passageway 37 to the inlet chamber 14 and thus directly apply the full inlet supply pressure to the cover chamber 36 and thereby, in cooperation with the coil spring 35, rapidly move the stem assembly 18 downwardly to establish sealing engagement between seat 17 and O-ring 19.

The closure valve 38 as shown in FIG. 2 is a two-way diaphragm valve similar in construction and operation to the main diaphragm valve 11. Valve 38 includes a stem assembly 56 mounted for axial movement within a valve opening 57 and carrying a diaphragm 58 closing an upper control opening on the discharge side of the valve. A pressure cover 59 overlies the diaphragm 58 and defines a pressure chamber which is selectively connected to the chambers 14 and 15 of valve body 12 by solenoid valve 10 for operation of the closure valve 38. The discharge side of the closure valve 38 is connected directly to the passageway 37 in the cover 22 and the inlet side of the closure valve 38 is connected via a conventional strainer unit 60 and a conduit 61 to a tapped takeoff 62 in the wall of valve body 12 defining chamber 14. The tapped takeoff 62 is not shown in FIG. 1 and is diagrammatically shown in FIG. 2 by a circular opening within the chamber 14. The line pressure is thus connected directly to the inlet side of the closure valve 38 and urges it to an open position. A conduit 63 connects the chamber defined by cover 59 to the solenoid valve 10 which in the deenergized state establishes communication between conduit 63 and the outlet chamber 15 of the main valve body 12 via a conduit 64 which is connected at the valve 11 by a suitable tapped takeoff 65 in the side wall of the valve body 12. In the deenergized state of the solenoid valve 10, the valve closure 38 is allowed to drain to the discharge side of the valve 11 and the main in-line pressure to the closure valve 38 opens it and transmits the operating closure force to the cover chamber 36. The solenoid valve 10 as hereinafter described can also be positioned to connect the incoming supply pressure to the cover chamber of the closure valve 38 and hold the closure valve in the closed position; in which position or state the pilot valve 39 controls the opening and closing of the main valve 11.

The pilot valve 39 is connected via the inlet connection 55 through a closing speed adjusting plug valve 66 and a conduit 67 to the accelerator valve 40. The plug valve 66 is of any known or suitable variable flow control and provides a first stage closing speed adjustment by regulating the flow rate therethrough and into the pilot valve 39. As shown, the valve 66 may be manually adjusted in accordance with any desired closing rate to prevent a too rapid closing of valve 11 and establishment of dangerous pressure in the main flow line 1 and associated equipment. As the valve 66 is of a well known construction, no further description thereof is deemed necessary or desirable.

The accelerator valve 40 which selectively couples valves 66 and 39 to the chambers 14 and 15 of main valve 11 is a three-way diaphragm controlled valve which is pressure controlled generally similar to that of valve 38. Generally, the illustrated accelerator valve 40 includes a tubular body portion 68 internally divided into a pair of opposed chambers one of which is connected to conduit 67 and the opposite of which constitutes a drain outlet and is connected to the chamber 15 in series with a rate of flow control valve 69, a pressure reducing valve 70 and a conduit 71. A stem and valve assembly 72 is reciprocally mounted within a vertical opening between the chambers of tubular body portion 68 and includes a diaphragm 73 within a cover chamber defined by a suitable cover 74. The pressure in cover chamber controls the positioning of the stem and valve assembly 72. A lateral supply connection 75 is provided in alignment with and on the opposite side from the cover 74 to establish a perpendicular connection to the supply chamber which is connected to the conduit 67. A conduit 76 connects the supply connection 75 directly to the tapped takeoff 62 and impresses the incoming supply pressure directly into the valve 40 and upon the underside of the stem and valve assembly 72; shown in FIG. 1 connected on the opposite side of chamber 14 from conduit 61. A conduit 77 connects the cover 74 to the solenoid valve 9 which in turn is adapted to selectively connect the cover chamber to the supply or inlet chamber 14 or to the drain or outlet chamber 15 for selective positioning of the stem and valve assembly 72. As previously noted, valve 40 however is a three way valve and in one position, when the cover chamber is connected to the drain, connects conduit 76 and conduit 67 and in the alternate position, when the cover chamber is connected to the supply, connects conduit 67 to the rate of flow control valve 69.

Solenoid valves 9 and 10 thus control the connection of the closure valve 38 and the accelerator valve 40 to close and open the main valve 11. Each of the solenoid valves 9 and 10 is substantially identically constructed and solenoid valve 9 is hereinafter more fully described in some detail with corresponding elements in valve 10 identified by similar primed numbers for clarity and simplicity of description.

The solenoid valve 9 is a three way valve having an operating winding 78 connected by corresponding line 8 to switch unit 6 and thereby to a suitable source of power. Solenoid valve 9 includes three interconnected passageways which are diagrammatically illustrated in FIGS. 2, 4 and 5. Generally, the solenoid valve 9 includes a pair of opposed passageways 80 and 81 and a lateral passageway 82. The passageway 80 is connected to the conduit 77 and thus to the control chamber of accelerator valve 40. The passageway 82 is connected by a conduit 83 to conduit 64 and thus to the drain or discharge chamber 15 of the main valve body 12. A conduit 84 connects the passageway 81 of valve 9 to passageway 80' of valve 9 and also via an interconnecting conduit 85 to the strainer 60 and thus via the conduit 61 to the inlet chamber 14 of main valve 11.

The operation of the solenoid valves 9 and 10 is controlled by the setting of the counter 4 in accordance with the preselected quantity of liquid to be transferred from the supply to the tank truck.

Generally, it is desired to establish a preselected rate of flow at a preselected pressure and for that purpose, the rate of flow control valve 69 and the pressure reducing valve 70 are connected between the accelerator valve 40 and the discharge chamber 15 of valve body 12. Valves 69 and 70 may be of any known or desired construction. Those illustrated being of a known hydraulic actuated construction are briefly described hereinafter to the extent necessary to clearly illustrate the present invention.

Referring first to the rate of flow control valve 69, it includes a valve housing or body 86 within which a valve assembly is reciprocally mounted and coupled at the upper end to a control diaphragm 88. A cover 89 is secured to the body 86 with the diaphragm 88 secured therein and dividing the cover chamber into a pair of opposed control chambers on the opposite sides of the diaphragm 88. Control conduits or lines 90 and 91 are connected in communication with the chambers on the opposite sides of the diaphragm 88 and connected to an orifice flange assembly 91 interposed between the inlet flange of valve 11 and the flow line 11. The diaphragm 88 is preloaded by a suitable spring 93 to a preselected level by an adjustment screw 94 provided in the upper end of the valve cover 89 to control the preload compression of the spring 93. In accordance with known functioning, the control lines 90 and 91 establish an opposed pressure on the opposite sides of the diaphragm in accordance with the rate of flow which in cooperation with the spring 93 establishes and controls flow through the accelerator valve 40 and the transmission of pressure to the pilot valve 39. During the period of flow in line 1, the solenoid 9 connects valve 40 to the supply chamber 14 and holds the valve and stem assembly 72 in the position shown in FIGS. 4 and 5 connecting the conduit 67 to the drain side of valve 40. The valve seat 95 of assembly 72 includes a small orifice 96 maintaining a small pressure transmission from the supply chamber 14 to the chambers of valve 40. During the flow period, the rate of flow control valve 69 establishes a variable restricted passageway from the pilot valve conduit 67 and the flow through orifice 96 backs up through valve 66 and pilot valve 39 into the cover chamber 36. The partial pressure in chamber 36 forces the stem assembly 18 of main valve 11 down to restrict flow and establish the desired rate of flow. The pressure reducing valve 70 operates similarly to maintain a predetermined downstream pressure. Valve 70 includes tubular housing 97 having a spring loaded diaphragm 98 forming a part of valve and stem assembly 99 mounted within the valve housing 97 by a cover 100. A preloading spring 101 is mounted within the cover 100 with an adjustment screw 102 threadedly mounted in the cover 100 for establishing an adjustable preloading force on the diaphragm 98 in accordance with the position of adjusting screw 102. Conduit 103 is connected between the top surface of housing 97 and the immediately adjacent side of the diaphragm 98 and establishes a pressure therein in opposition to the preloading of the spring 101. With the main valve 11 open, the discharge or downstream pressure is transmitted via the conduits 71 and 103 to oppose the pressure of the spring 101. The valve assembly 99 is positioned in accordance with the balance between the two forces and varies the flow path through the valve 70 accordingly. Valve 70 thereby varies the drain connection for pilot valve 39 in a manner similar to that of valve 69 but in accordance with the downstream pressure to adjust the main valve 11 setting until the desired downstream pressure is obtained.

Generally, the operation of the illustrated embodiment of the invention is summarized as follows.

The rate of flow control valve 69 and the pressure control valve 70 are preset to establish a predetermined maximum rate of flow and a predetermined or downstream discharge pressure. The set stop pilot valve stem 43 is positioned within the valve body 41 of pilot valve 39 to space the lower end of the poppet extension 52 in spaced relation to the stem 25 of main valve 11 in accordance with the desired partial opening of the valve 11 during the throttling period just prior to complete closure of the valve.

The counter 4 is preset to a reading of the total gallonage to be delivered. The counter 4 is thus preset from the zero reading and the switches 6 and 7 are closed to energize the solenoids 9 and 10.

Figure 4:
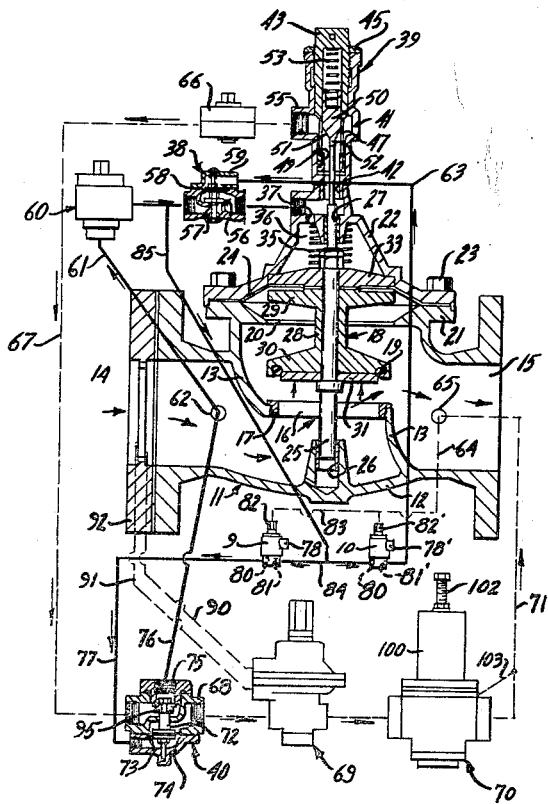
FIG. 4 is a reduced sectional view similar to FIG. 2 with some of the components shown in elevation when the set stop valve is in the total flow position.

Referring particularly to FIG. 4 which illustrates a full flow condition as a result of energizing solenoids 9 and 10, the opening of solenoid 10 supplies liquid under pressure from supply chamber 14 through strainer 16 and conduit 85 to passageway 80' and passageway 81' and conduit 63 to the chamber defined by cover 59 of closure valve 38. As a result, closure valve 38 closes and disconnects the pressure previously transmitted via the valve to the cover chamber 36.

Simultaneously, the operation of solenoid valve 9 has transmitted or supplied liquid under pressure to the cover chamber of the accelerator valve 40 which is moved to disconnect the supply of liquid therethrough to the pilot valve 39 and to connect the pilot valve 39 to the drain side of the valve 40. The drain connection is completed via the rate of flow control valve 69 and the pressure control valve 70 to the drain or discharge chamber 15 of the main valve 11. The pilot valve 39 may drain outwardly through the accelerator valve 40. As a result, the incoming pressure in chamber 14 causes the stem assembly to move upwardly with the fluid in the cover chamber 36 establishing an upward pressure on the lower end of the poppet 50 which is forced off of its seat 49 and the main valve 11 drains through the plug valve 66 and accelerator valve 40 to the outlet or discharge chamber 15 of the main control valve 11. The relieving of the pressure in the chamber 36 permits the fluid pressure under the stem assembly 18 in the main valve 5 to raise the stem assembly and open the valve to the full flow position shown in FIG. 4. In this position, a full flow loading cycle is in operation and the flow will be maintained through the main valve 11 in accordance with the rate of flow control setting of valve 69 and the pressure setting the pressure control valve 70 in accordance with the previously described operation of the latter valves.

Figure 5:
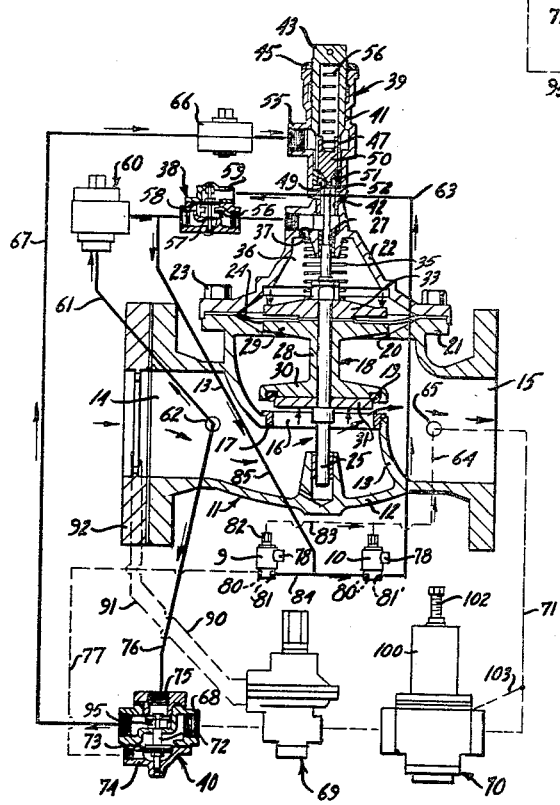
FIG. 5 is a view similar to FIG. 4 showing the set stop valve in the modulating or partial flow position during the throttling period when the total flow approaches the final setting or preselected quantity.

During the full flow period, the meter 3 drives counter 4 toward zero. As the total flow reaches the preselected quantity, the reading of counter 4 approaches the zero reading and at a preselected reading prior to the final zero reading, the counter 4 allows switch 6 to return to the normally open position and deenergize the solenoid valve 9, as shown in FIG. 5. The control chamber of accelerator valve 40 is now connected to the drain or discharge chamber 15 of the main valve 11 and the supply chamber 14 is connected to inlet connection 75 and returns the accelerator valve 40 to the positioning closing the drain connection previously described.

As a result, the line pressure is transmitted through accelerator valve 40 and the conduit 67 and the speed of closing adjustment valve 66 to the inlet connection 55 of the pilot valve 39. The flow continues and the pressure is transmitted through the pilot valve 39 and into the cover chamber 36 of the main valve 11. As a result, the stem assembly 18 moves downwardly until the poppet 50 in valve 39 engages the seat 49 and discontinues the supply therethrough to the cover chamber 36. The stem assembly 18 remains in the throttling position during the complete throttling period and establishes a relatively low rate of flow through the valve 11.

The rate at which the main valve 11 is closed to the throttling position is readily adjusted by setting of the valve 66 to provide any desired rate of flow therethrough and thus varying the transmission of the pressure through the pilot valve 39 to the main valve 11. Further, the throttling position of the main valve 11 is readily adjusted to suit the conditions required by the system by the loosening of the lock nut 45 at the top of the set stop pilot valve 39 and properly turning the stem 43 to locate the poppet 50 in any desired relation with respect to the stem 25. Thus, if the stem 43 is threaded inwardly it will maintain transmission of pressure to chamber 36 until the stem 25 has lowered to a greater extent and similarly if the stem is threaded outwardly it will cut off the pressure transmission more rapidly and before the stem assembly 18 has lowered to the position shown in FIG. 4.

Flow continues through the main valve 11 at the preselected reduced flow rate. The meter 4 continuously drives the counter 3 at the reduced rate toward the zero reading. When the counter approaches the zero reading and at a reading substantially at zero, the switch 7 is allowed to return to the normally open position and the solenoid valve 10 is deenergized. The precise reading at which switch 7 is actuated is adjusted to compensate for the small time lag in the operation of the closure valve 38 and main valve 11. The solenoid valve 10 then returns to the normal standby position in which the cover chamber of valve 38 is disconnected from the supply and connected to the drain or discharge chamber 15 of the main valve 11. As a result, the pressure control liquid in valve 38 is allowed to drain from the closure valve 38 and relieves the pressure therein which permits it to open as a result of the incoming supply pressure on the inlet side. The supply pressure is transmitted under pressure to the cover chamber 36 directly through the passageway 37 in the cover 22 of the main valve 11 and in cooperation with the spring 35 forces the stem assembly 18 downwardly to rapidly completely close the valve against all flow as shown in FIG. 2.

The time lag between the operation of the counter and the final closure switch 7 is relatively small and can be accurately compensated for in the setting of the operation of the switch 7. It has been found that the present invention can be employed to deliver large quantities of liquid to a tank truck or the like at a very rapid rate and to the exact preselected amount. This accurate control contrasts with prior commercial devices wherein a tolerance of 35 to 50 gallons is not unusual in transmitting of petroleum products to tank trucks and the like.

During the throttling period, the flow has been reduced to a sufficient level that the main valve 11 can be very rapidly moved to the closed position without establishment of any dangerous pressures in the system of the flow line 1 on the inlet side of the valve 11.

The present invention thus provides a reliable and accurate means for metering preselected quantities of flow at high rates and pressures. The present invention also provides a set stop valve assembly which can function without changing the structure of the valve assembly in any one of three systems; that is, merely a set stop control, a set stop control with either or both of the rate of flow control and the pressure control. Further, the electrical interconnect provides a very simple means for stopping the flow instantly if an emergency arises. It is merely necessary to insert the controls in one of the connecting control lines such as between the main valve 11 and the control accelerator valve 40 in the illustrated embodiment of the invention.

Varius modes of carrying out the invention are contemplated as being within the scope of the following claims particularly pointing out and distinctly claiming the subject matter which is regarded as the invention.

I claim:

1. A set stop valve system for stopping flow in a line in sequential flow stages of preselected constant flow rates, comprising
    (a) a main valve adapted to be mounted within the line,
    (b) a final control coupled to the main valve for selectively opening and closing thereof and establishing a selected first flow rate,
    (c) a throttling control coupled to the main valve for varying the opening established by the final control to establish a second flow rate and including a presettable means to vary the degree of control and establishing a throttling opening of the main valve, and
    (d) quantity flow responsive means for sequentially acting said throttling and final controls to sequentially reduce the flow to said second flow rate and then cease flow.

2. A set stop valve system for stopping flow in a line in sequential flow stages of preselected constant flow rates, comprising
    (a) a main valve adapted to be mounted within the line and being urged to an open valve position,
    (b) a pressure responsive control for closing said main valve,
    (c) a final control adapted to selectively actuate the pressure responsive control for selectively establishing a full opening and closing thereof,
    (d) a throttling control coupled to said pressure responsive control and operative only with the final control actuating the valve to the full open position and including a presettable means to vary the opening of the main valve, and
    (e) quantity flow responsive means for separately and sequently actuating said throttling and final controls to reduce the flow and then cease flow.

3. A set stop valve system for stopping flow in a line in sequential flow stages, comprising
    (a) a main hydraulically responsive valve adapted to be mounted within the line and being urged to a full open position by the line pressure,
    (b) a pressure responsive control coupled to the main valve and responsive to the line pressure to close the valve,
    (c) a final control valve adapted to couple the pressure responsive control to the input side of the main valve for selective closing thereof,
    (d) a throttling control adapted to independently couple the pressure responsive control to the input side of the main valve and to the outlet side of the main valve and including a presettable means to vary the degree of control and thereby vary the opening of the main valve, and
    (e) a quantity flow responsive means for sequentially actuating said throttling and final controls to reduce the flow and then cease flow.

4. The set stop valve system of claim 3 wherein
    (a) said throttling control includes a resiliently mounted valve closure means in the connection of the pressure responsive means, and
    (b) means operatively coupling said valve closure means and the main valve after predetermined movement of the main valve to hold the valve closure means in an open valve position whereby said throttling control is effective to correspondingly partially close the main valve.

5. The set stop valve system of claim 3 wherein
    (a) the presettable means of said throttling control includes a valve means connecting the pressure responsive control to the input side, said valve means having an adjustably positioned valve seat and a poppet urged into engagement with the valve seat, and
    (b) means coupling the poppet to the main valve to hold the poppet from the valve seat in accordance with the positioning of the valve seat with respect to the main valve.

6. A set stop valve system adapted to be connected in a flow line for opening and closing thereof, comprising
    (a) a main valve urged to the full flow position by the incoming liquid and having a pressure responsive means for closing the valve,
    (b) a first control valve selectively connecting said pressure responsive means to the inlet side of the main valve for closing the main valve, and
    (c) a second control valve selectively and independently connecting said pressure responsive means to opposite sides of the main valve and including a resiliently mounted valve member urged to close the control valve and coupled to the main valve and moved to the open position thereby after a preselected opening of the main valve, whereby connection to the inlet side of the main valve operates to close the main valve to the preselected opening.

7. The set stop valve system of claim 6 having
    (a) means adapted to be actuated in accordance with the volumetric flow in the flow line, and
    (b) signal generating means coupled to be operated by predetermined operation of said means and connected to control said first and second control valves to first reduce the flow rate and to subsequently stop the flow.

8. The set stop valve system of claim 7 wherein said signal generating means actuates electromagnetic valve means which are coupled to actuate said control valves.

9. A set stop valve system adapted to be connected downstream in a pressurized flow line for opening and closing thereof, comprising
    (a) a main diaphragm valve including a valve closure member urged to the full flow position by the line pressure incoming liquid and to a closed position by a pressure in a pressure responsive means connected to the member to oppose the valve, (b) a first main control valve selectively connecting said pressure responsive means to the inlet side of the main diaphragm valve for closing the main diaphragm valve, and (c) a second main control valve selectively and independently connecting said pressure responsive means to opposite sides of the main diaphragm valve and including a resiliently mounted valve member urged to close the control valve and coupled to the main diaphragm valve and moved to the open position thereby after a preselected opening of the main diaphragm valve, whereby the connection to the inlet side of the main valve operates to close the main valve to the preselected opening.

10. The set stop valve system of claim 9 including (a) a three-way control valve having a signal passageway connected to said second main control valve, a supply passageway connected to the input side of the main valve and a drain passageway connected to the output side of the main valve and a valve member to selectively connect the signal passageway to one or the other of the other passageways, (b) pressure responsive means for operating the first main control valve, (c) an electromagnetic valve means adapted to selectively connect the pressure responsive means to the inlet side and the outlet side of the main valve, (d) a pressure responsive means for operating the three-way control valve, (e) an electromagnetic valve means adapted to selectively connect the last-named pressure responsive means to the inlet side and the outlet side of the main valve, and (f) flow responsive means for actuating said electromagnetic valve means in a predetermined time spaced sequence.

11. The set stop valve system of claim 10 wherein said flow responsive means includes, (a) a flow meter having a counting mechanism driven in proportion to the flow through the meter, and (b) a pair of switch means actuated by predetermined operation of said counting mechanism and connected one each in an energizing circuit for each of said electromagnetic valve means.

12. The set stop valve system of claim 11 wherein (a) the counting mechanism is a digital counter device actuated by the meter, and (b) the switch means are coupled to be operated at predetermined readings of the counter for controlling said electromagnetic valve means to first reduce the flow rate and to subsequently stop the flow.

13. In a set stop valve system adapted to be connected in a flow line for opening and closing thereof, (a) a main diaphragm valve urged to the full flow position by the incoming liquid and having a pressure responsive means for closing the valve, (b) a first control valve selectively connecting said pressure responsive means to the inlet side of the main diaphragm valve for closing the main diaphragm valve, (c) a second control valve having an input selectively and independently connected to opposite sides of the main diaphragm valve and an output connected to said pressure responsive means and including a resiliently mounted valve member urged to close the control valve and coupled to the main diaphragm valve and moved to the open position thereby after a preselected opening of the main diaphragm valve, whereby the connection to the inlet side of the main valve operates to close the main valve to the preselected opening, and (d) an adjustable valve connected in series with said second control valve to the main valve for presetting the rate of closing of the main valve by said second control valve.

14. A flow control system for opening and closing a flow line having a flow responsive meter therein after a preselected volume of flow, comprising, (a) flow related means adapted to be coupled to said meter and driven thereby, (b) signal generating means coupled to be actuated by said flow related means, (c) a set stop main valve adapted to be connected in the flow line, said main valve being a pressure actuated valve and having a stem assembly carrying a valve sealing member urged to a fully open position by the pressure in the inlet side thereof and having a main pressure control chamber coupled to the stem assembly for closing the valve, (d) an on-off pressure actuated valve having a discharge side connected to the pressure control chamber and an inlet side connected to the inlet side of the main valve and an on-off control chamber, (e) a three-way valve having a first passageway connected to the outlet side of the main valve, a second passageway connected to the inlet side of the main valve and a third passageway connected to the on-off control chamber of the on-off pressure actuated valve, said valve being connected to the signal generating and actuated thereby to alternately establish and relieve pressure in the on-off control chamber, (f) a set stop pilot valve having a tubular valve body secured to the cover of the main valve in alignment with the main valve stem and establishing a flow path between a pilot valve inlet connection and the main pressure control chamber and having a valve closure means urged to close the flow path and being operatively coupled to the stem assembly of the main valve and held open for a preset movement of the stem assembly, (g) a first stage closing speed valve connected to the input connection of the pilot valve, (h) a three-way pressure actuated accelerator valve connected to the speed valve, the outlet side of the main valve and the inlet side of the main valve, said valve having a stem assembly selectively connecting the speed valve to the inlet side and outlet side of the main valve, the stem assembly being urged by the line pressure in the connection to the inlet side of the main valve to permit flow from the inlet side therethrough and an accelerator control chamber for the stem diaphragm assembly adapted to overcome the action of the line pressure, said stem assembly including an orifice providing restricted communication between the connection to the inlet side of the main valve and the connection with the speed valve with the valve actuated by the control chamber, and (i) a three way valve having a first passageway connected to the outlet side of the main valve, a second passageway connected to the accelerator control chamber and a third passageway connected to the inlet side of the main valve, said second three way valve being connected to the signal generating means and actuated thereby to reduce the opening of the main valve in response to preselected actuation of the signal generating means and throttle the flow through the main valve whereby the main valve can be abruptly closed without establishing dangerous pressures within the flow line.

15. The flow control system of claim 14 having (a) a rate of flow control valve, and (b) a discharge pressure control valve connected with the flow control valve in the flow path of the drain connection of the accelerator valve to the outlet side of the main valve.

16. A flow control system for opening and closing a pressurized flow line having a flow meter therein, comprising (a) a set stop main valve having means biasing a valve member to a predetermined flow position and having a pressure control chamber for opposing said means and establishing a second valve position, a follower member in said pressure control chamber positioned in accordance with the valve member, (b) an on-off control valve connected to the pressure control chamber and to the inlet chamber of the main valve and selectively opened and closed to open and block the flow passage to the control chamber, said control valve having a pressure control chamber, (c) a pilot valve having a tubular valve body with the lower end secured in communication with the main pressure control chamber, a tubular valve stem secured within the valve body by a threaded connection to allow axial positioning thereof, said valve stem being closed at the upper end and having a tubular valve seat releasably secured in the lower end and having a plurality of axial slots in the lower portion of the stem, sealing means disposed between the stem and body on opposite sides of the slots, a poppet slidably mounted in the valve stem and having a conical surface adapted to sealingly engage the valve seat and a projection extending downwardly through the valve seat into the path of the follower member of the main valve, means resiliently urging the poppet into sealing position, the position of the tubular valve stem establishing a predetermined spacing between the poppet projection and the follower member of the main valve, said valve body having a fluid connection selectively connected to the inlet chamber and the outlet chamber of the main valve, (d) a first stage closing speed valve connected to said intermediate fluid connection and having means for adjusting the flow passageway therethrough, (e) a modulating valve means for alternately connecting the speed valve to the inlet side of the main valve and to the outlet side of the main valve and including positioning means for resiliently establishing one of said connections and having a pressure control chamber for opposing said positioning means and establishing the other of said connections, (f) a three-way solenoid valve selectively connecting the inlet side of the main valve and the outlet side of the main valve to the pressure control chamber of the modulating valve means, (g) a three-way solenoid valve selectively connecting the inlet side of the main valve and the outlet side of the main valve to the pressure control chamber of the on-off control valve, (h) a presettable flow responsive means adapted to be preset in accordance with quantities of preselected flow and adapted to be progressively returned to the original position in accordance with the flow in the line, (i) a first switch means connected in an energizing circuit for said first-named solenoid valve and coupled to the flow responsive means to energize the corresponding solenoid with the flow responsive means at predetermined preset positions, and (j) a second switch means connected in an energizing circuit for said second-named solenoid valve and coupled to the flow responsive means to energize the corresponding solenoid with the flow responsive means at predetermined preset positions thereof including predetermined preset positions preceding those related to the first switch means.

17. The flow control system of claim 16 having (a) a restricted passageway means in the modulating valve maintaining restricted flow from the inlet side of the main valve to the speed valve, (b) a rate of flow control valve adapted to be connected in the connection of the outlet side of the main valve to the modulating valve, and (c) a pressure control valve adapted to be connected in the connection of the outlet side of the main valve to the modulating valve.

18. A flow control system for opening and closing a flow line having a flow responsive meter therein after a preselected volume of flow, comprising (a) a presettable counter adapted to be coupled to said meter and driven to a zero reading by said meter, (b) a first and a second normally open switch coupled to be actuated by said counter, the first of said switches being actuated when the counter is operatively at the zero reading and the second of said switches being actuated when the counter is at a preselected counter reading slightly above the zero reading, (c) a set stop main valve adapted to be connected in the flow line, said main valve being a diaphragm actuated valve and having a stem assembly carrying a valve sealing member urged to a fully open position by the pressure in the inlet side thereof and having a cover overlying the diaphragm and defining a main pressure control chamber, said stem assembly having an operating stem projecting outwardly through the cover, (d) an on-off diaphragm valve having a discharge side connected to the main pressure control chamber and an inlet side connected to the inlet side of the main valve and an on-off control chamber, (e) a solenoid-actuated three-way valve having a first passageway connected to the outlet side of the main valve, a second passageway connected to the inlet side of the main valve and a third passageway connected to the on-off control chamber of the on-off diaphragm valve, said valve being connected to the first switch and actuated thereby to alternately establish and relieve pressure in the on-off control chamber, (f) a set-stop pilot valve having a tubular valve body secured to the cover of the main valve in alignment with the main valve stem and establishing a flow path between a pilot valve inlet connection and the main pressure control chamber and having a poppet resiliently mounted for movement with the main valve stem within a tubular pilot valve stem for selectively interrupting the flow path, said valve stem being adjustably mounted within said valve body to adjust the position of the popplet relative to said main valve stem and thereby vary the position of the main valve stem at which the poppet interrupts the flow path, (g) a first stage closing speed valve connected to the input connection of the pilot valve, (h) a three-way diaphragm accelerator valve having a first flow connection connected to the speed valve, a drain connection connected to the outlet side of the main valve and a supply connection connected to the inlet side of the main valve, said accelerator valve having a diaphragm stem assembly selectively connecting the first flow connection to the supply and drain connections and having an accelerator control chamber for the stem diaphragm assembly and an orifice providing restricted communication between the supply connection and first flow connection with the latter communicating with the drain connection, (i) a solenoid actuated three way valve having a first passageway connected to the outlet side of the main valve, a second passageway connected to the accelerator control chamber and a third passageway connected to the inlet side of the main valve, said second solenoid valve being connected to the second switch and actuated thereby to reduce the opening of the main valve in response to actuation of the corresponding switch and throttle the flow through the main valve whereby the main valve can be abruptly closed without establishing dangerous pressures within the flow line, (j) a rate of flow control valve, and (k) a discharge pressure control valve connected in series with the flow control valve in the flow path of the drain connection of the accelerator valve to the outlet side of the main valve.

19. A flow control system for opening and closing a pressurized flow line having a flow meter therein, comprising (a) a set-stop main valve having an axial horizontal passageway divided by a transverse wall means into an inlet chamber and an outlet chamber, said transverse wall means having a vertical opening and a stem assembly having a stem carrying a valve closure member for engaging the edge of the opening for opening and closing the same, a diaphragm secured to the stem assembly and secured within an opening in the top wall portion of the valve in alignment with the valve opening, a cover disposed over the diaphragm and defining a pressure control chamber, said cover being provided with a first control passageway and a second control passageway which is aligned with the stem assembly and has the stem passing upwardly therethrough, (b) an on-off control valve connected to the first control passageway and adapted to selectively connect the pressure control chamber to the inlet chamber of the main valve and to block the first control passageway, said control valve having a pressure control chamber, (c) a pilot valve having a tubular valve body with the lower end secured within the second control passageway, a tubular valve stem secured within the valve body by a threaded connection to allow axial positioning thereof, said valve stem being closed at the upper end and having a tubular valve seat releasably secured in the lower end and having a plurality of axial slots in the lower portion of the stem, sealing means disposed between the stem and body on opposite sides of the slots, a poppet slidably mounted in the valve stem and having a conical surface adapted to sealingly engage the valve seat and a projection extending downwardly through the valve seat in alignment with the stem of the main valve, spring means urging the poppet into sealing position, the position of the tubular valve stem establishing a predetermined spacing between the poppet projection and the stem of the main valve, said valve body having an intermediate fluid connection selectively connected to the inlet chamber and the outlet chamber, (d) a first stage closing speed valve connected to said intermediate fluid connection and having means for adjusting the flow passageway therethrough, (e) a three-way accelerator valve having an axial passageway divided by a transverse wall into a control chamber connected to the speed valve and a drain chamber connected to the drain chamber of the main valve and a supply chamber opening connected to the inlet chamber of the main valve, said transverse wall having a valve opening aligned with the supply chamber opening, a stem assembly carrying a valve closure means to alternately close the openings and being urged to close the valve opening by the line pressure, said valve closure means having an orifice establishing restricted flow from the inlet chamber of the main valve with the supply chamber opening closed, a diaphragm secured to the stem assembly and forming a part of a pressure control chamber for positioning the closure member against the action of the line pressure, (f) a three-way solenoid valve having a supply passageway connected to the main valve inlet chamber and a drain passageway connected to the main valve outlet chamber and a control passageway connected to the pressure control chamber of the accelerator valve, (g) a three-way solenoid valve having a supply passageway connected to the main valve inlet chamber and a drain passageway connected to the main valve outlet chamber and a control passageway connected to the pressure control chamber of the on-off control valve, (h) a preset counter adapted to be preset to a reading of a preselected flow and adapted to be progressively returned to zero in accordance with the flow in the line, (i) a first switch connected in an energizing circuit for said first-named solenoid valve and coupled to the counter to energize the corresponding solenoid until the counter is driven to predetermined reading greater than zero, (j) a second switch connected in an energizing circuit for said second-named solenoid valve and coupled to the counter to energize the corresponding solenoid until the counter is driven to essentially a zero reading, (k) a rate of flow control valve adapted to be connected in the connection to the drain chamber of the accelerator valve, and (l) a pressure control valve adapted to be connected in the connection to the drain chamber of the accelerator valve.

20. A pilot valve adapted to be connected to control a pressure responsive main valve with a pressure control chamber having a follower member therein positioned in accordance with the flow position of the main valve, said pressure responsive valve being connected in a pressurized flow line for opening and closing thereof, comprising, (a) a tubular valve body with the one end adapted to be secured in communication with the pressure control chamber, (b) a tubular valve stem secured within the valve body by a threaded connection to allow axial positioning thereof, said valve stem being closed at the upper end and having a plurality of axial slots in the lower portion of the stem, (c) a tubular valve seat releasably secured in the lower end of the stem, (d) sealing means disposed between the stem and body on opposite sides of the slots, (e) a poppet slidably mounted in the valve stem and having a conical surface adapted to sealingly engage the valve seat and a projection extending downwardly through the valve seat into the path of the follower member, (f) resilient means urging the poppet into sealing position, the position of the tubular valve stem establishing a predetermined spacing between the poppet projection and the follower member of the main valve in the assembled relation, (g) a fluid connection to the valve body, and (h) means adapted to selectively connect the inlet side and the outlet side of the main valve to the fluid connection.

References Cited by the Examiner

UNITED STATES PATENTS 2,997,271   8/61   Bounds _____ 222—477 X

FOREIGN PATENTS 777,838   6/57   Great Britain.

LOUIS J. DEMBO, *Primary Examiner.*

HADD S. LANE, *Examiner.*